(12) United States Patent
Trainin et al.

(10) Patent No.: US 7,715,442 B2
(45) Date of Patent: May 11, 2010

(54) METHOD, APPARATUS, AND SYSTEM OF WIRELESS TRANSMISSION WITH FRAME ALIGNMENT

(75) Inventors: Solomon B. Trainin, Haifa (IL); Assaf Kasher, Haifa (IL)

(73) Assignee: Intel Corporation, Santa Clara, CA (US)

( * ) Notice: Subject to any disclaimer, the term of this patent is extended or adjusted under 35 U.S.C. 154(b) by 918 days.

(21) Appl. No.: 11/360,865

(22) Filed: Feb. 24, 2006

(65) Prior Publication Data

US 2007/0204052 A1 Aug. 30, 2007

(51) Int. Cl.
*H04J 3/06* (2006.01)

(52) U.S. Cl. .................. 370/503; 370/464; 370/498; 370/509; 370/310; 370/260; 178/118

(58) Field of Classification Search ........... 370/464, 370/498, 503, 509, 350, 529, 310, 260; 325/320; 178/88

See application file for complete search history.

(56) References Cited

U.S. PATENT DOCUMENTS

| | | | | |
|---|---|---|---|---|
| 4,186,348 A * | 1/1980 | Lautier et al. | | 375/332 |
| 6,411,662 B1 * | 6/2002 | Sakoda et al. | | 375/340 |
| 2003/0043928 A1 * | 3/2003 | Ling et al. | | 375/267 |
| 2004/0190639 A1 * | 9/2004 | Pauli et al. | | 375/260 |
| 2005/0020299 A1 | 1/2005 | Malone et al. | | |
| 2005/0094618 A1 * | 5/2005 | Colban et al. | | 370/350 |
| 2005/0099936 A1 * | 5/2005 | Fujii et al. | | 370/203 |
| 2005/0128991 A1 | 6/2005 | Dayanandan et al. | | |
| 2005/0135318 A1 * | 6/2005 | Walton et al. | | 370/338 |
| 2005/0152408 A1 * | 7/2005 | Jeong et al. | | 370/529 |
| 2005/0249244 A1 * | 11/2005 | McNamara et al. | | 370/474 |
| 2006/0092892 A1 * | 5/2006 | Trachewsky | | 370/338 |
| 2006/0182017 A1 * | 8/2006 | Hansen et al. | | 370/208 |
| 2006/0182147 A1 | 8/2006 | Sanchez | | |
| 2006/0280155 A1 * | 12/2006 | Kwon et al. | | 370/338 |
| 2007/0070934 A1 * | 3/2007 | van Rooyen | | 370/328 |

OTHER PUBLICATIONS

IEEE Standard Part 11: Wireless Medium (MAC) and Physical Layer (PHY) Specification. (ISO/IEC 8802-11, ANSI/IEEE STD 802.11-1999) Chapter 9: MAC Sublayer Functional Description ISO/IEC 8802-11, ANSI/IEEE STD 802.11, Aug. 20, 1999 pp. 70-97.
International Search Report of Application No. PCT/US2007/004622 dated Aug. 6, 2007.
IEEE P802.11 Wireless LANS. "Joint Proposal: High throughput extension to the 802.11 Standard: PHY" Jan. 13, 2006.
International Preliminary Report on Patentability of Application No. PCT/US2007/004622 Mailed on Sep. 4, 2008.
Office Action from EP 07 751 389.3-1246, mailed on Feb. 17, 2009.

* cited by examiner

*Primary Examiner*—William Trost, IV
*Assistant Examiner*—Kyle C Kasparek
(74) *Attorney, Agent, or Firm*—Shiloh et al.

(57) ABSTRACT

Embodiments of the present invention provide a method, apparatus, and system of wireless transmission with frame alignment. For example, a method in accordance with demonstrative embodiments of the invention may include synchronizing between a transmitter using a first modulation scheme, which may have multiple frame formats, and a receiver using a second modulation scheme, by calculating a transmission time that aligns an inter frame space start time of the first and second modulation schemes. Other features are described and claimed.

24 Claims, 3 Drawing Sheets

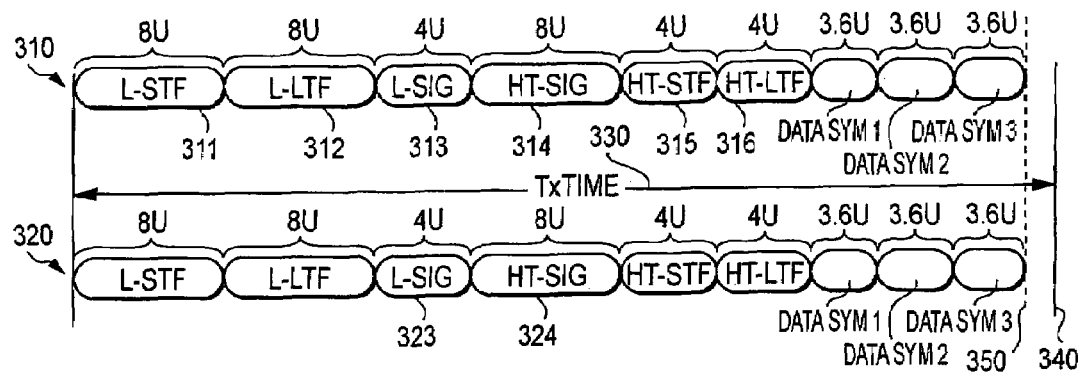
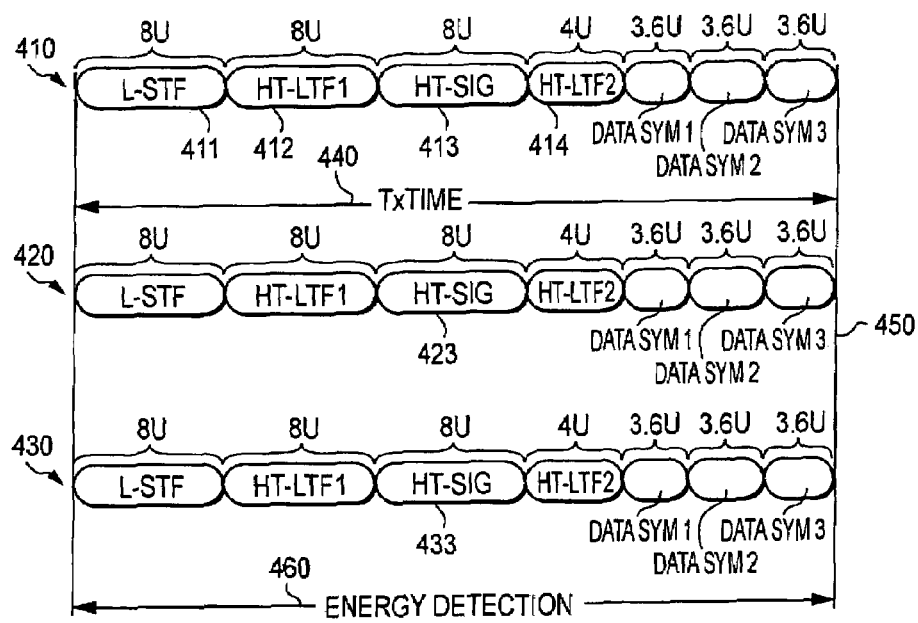
FIG. 3
FIG. 4

METHOD, APPARATUS, AND SYSTEM OF WIRELESS TRANSMISSION WITH FRAME ALIGNMENT

BACKGROUND OF THE INVENTION

In some wireless local area networks (WLANs), different stations may transmit frames of different modulations types. For example, the IEEE-Std 802.11, 1999 Edition (ISO/IEC 8802-11: 1999) ("802.11") set of standards allows coexistence of different formats of physical layer (PHY) protocol data units (PPDUs), or frames, in the same frequency channel. The various formats may differ, for example, in the respective sizes of the transmitted frames.

Network stations may use a channel access mechanism and a control mechanism to protect transportation of packets over the network, e.g., to avoid collision of frames. For example, a station may wait for the channel to be clear before transmitting the next frame. One solution may be to utilize a request-to-send/clear-to-send (RTS/CTS) mechanism, including setting a network allocation vector (NAV) to reserve the wireless medium for a predetermined period of time. However, such a protection method may cause significant overhead by taking up part of the available bandwidth and/or power for transmission of management frames. In addition, a network station that is in a power-save mode may not receive the RTS/CTS frames.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 3 is a schematic diagram of aligned frames in accordance with one demonstrative embodiment of the invention; and FIG. 4 is a schematic diagram of aligned frames in accordance with another demonstrative embodiment of the invention.

Figure 1:
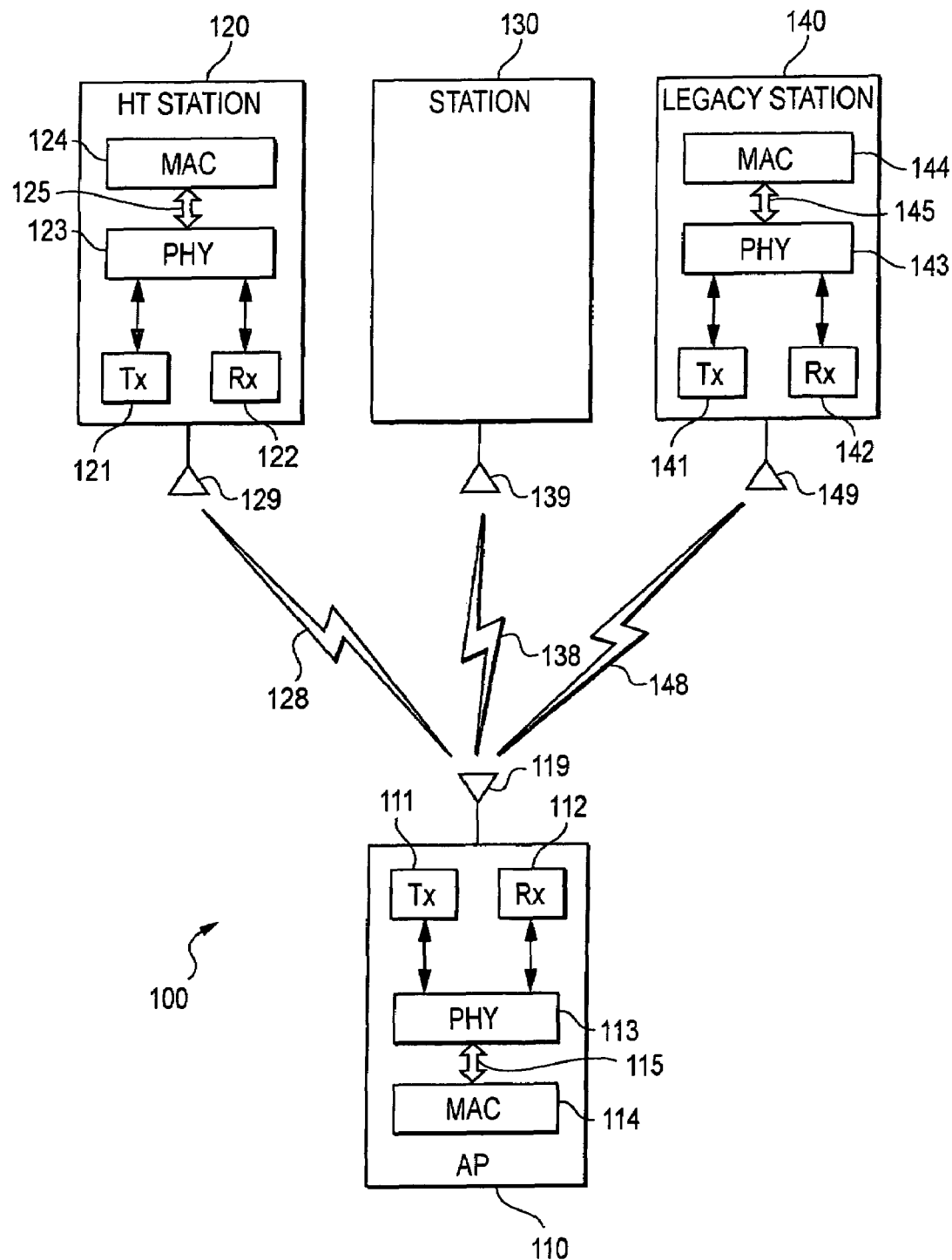
FIG. 1 is a schematic diagram of a wireless communication system in accordance with some demonstrative embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include an apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROM), compact disc read-only memories (CD-ROM), random access memories (RAM), electrically programmable read-only memories (EPROM), electrically erasable and programmable read only memories (EEPROM), FLASH memory, magnetic or optical cards, or any other type of media suitable for storing electronic instructions and capable of being coupled to a computer system bus.

It should be understood that the present invention may be used in a variety of applications. Although the present invention is not limited in this respect, the circuits and techniques disclosed herein may be used in many apparatuses such as units of a wireless communication system, for example, a wireless local area network (WLAN) communication system and/or in any other unit and/or device. Units of a WLAN communication system intended to be included within the scope of the present invention include, by way of example only, modems, mobile units (MU), access points (AP), wireless transmitters/receivers, and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), a personal area network (PAN), or a global communication network, for example, the Internet.

Types of WLAN communication systems intended to be within the scope of the present invention include, although are not limited to, WLAN communication systems as described by "IEEE-Std 802.11, 1999 Edition (ISO/IEC 8802-11: 1999)" standard ("the 802.11 standard"), and more particularly in "International Standard ISO/IEC 8802-11:1999/Amd 1:2000(E) IEEE Std 802.11a-1999 Part 11: Wireless LAN Medium Access Control (MAC) and Physical Layer (PHY) specifications Amendment 1: High-speed Physical Layer in the 5 GHz band" ("the 802.11a standard"), "IEEE-Std 802.11n—High throughput extension to the 802.11" ("the 802.11n standard"), and the like.

Although the scope of the present invention is not limited in this respect, the circuits and techniques disclosed herein may also be used in units of wireless communication systems, digital communication systems, satellite communication systems, and the like. Some embodiments of the invention may be used in conjunction with one or more types of wireless communication signals and/or systems, for example, radio frequency (RF), infra red (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), or the like. Embodiments of the invention may be used in various other apparatuses, devices, systems and/or networks.

Although the scope of the present invention is not limited in this respect, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the internet. It should be understood that the present invention may be used in a variety of applications.

Part of the discussion herein may relate, for demonstrative purposes, to transmitting a frame, e.g., a physical layer (PHY) protocol data unit (PPDU). However, embodiments of the invention are not limited in this regard, and may include, for example, transmitting a signal, a packet, a block, a data portion, a data sequence, a data signal, a data packet, a preamble, a signal field, a content, an item, a message, or the like.

Reference is made to FIG. 1, which schematically illustrates a wireless communication system 100 in accordance with an embodiment of the present invention. It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

In some demonstrative embodiments of the invention, communication system 100 may for example, a wireless network or a network that may include wireless components. For example, communication system 100 may include or may be a wireless local area network (WLAN) in accordance with the 802.11 family of standards. Although embodiments of the invention are not limited in this respect, communication system 100 may include, for example, a basic service set (BSS) provider such as an access point (AP) 110, as well as one or more wireless mobile units such as a station (STA), for example stations 120, 130, and 140.

In some embodiments, AP 110 and one or more of STA 120, 130, and 140 may communicate network traffic over a shared access medium using one or more wireless links, e.g., links 128, 138, and 148, respectively. Links 128, 138, and 148 may each include a downlink and an uplink, as are known in the art. Although embodiments of the invention are not limited in this respect, the traffic that may be carried via links 128, 138, and 148 may include packets, frames, or other collections of signals and/or data, such as, e.g., media access controller (MAC) protocol data units (MPDUs) and/or physical layer (PHY) protocol data units (PPDUs), that may make up a transmission of wireless signals. In accordance with some demonstrative embodiments of the invention, wireless communication system 100 may enable coexistence of different modulation schemes and/or frame formats, as explained in more detail below with reference to FIG. 2.

Although embodiments of the invention are not limited in this respect, each of AP 110, STA 120, STA 130, and STA 140 may be operatively coupled with at least one radio frequency antenna 119, 129, 139, and 149, respectively, which may include or may be an internal and/or external RF antenna, for example, a dipole antenna, a monopole antenna, an omni-directional antenna, an end-fed antenna, a circularly polarized antenna, a micro-strip antenna, a diversity antenna, or any other type of antenna suitable for transmitting and/or receiving wireless communication signals, blocks, frames, transmission streams, packets, messages and/or data.

In some embodiments, AP 110 may be a dedicated device with additional functionality such as, for example, providing a bridge to wired network infrastructure or arbitrating communication of stations in the WLAN. For example, AP 110 may facilitate communication with a wider network such as, for example, the Internet or an intranet, by either wired or wireless communication. A BSS provider such as AP 110 may in some embodiments associate wireless devices such as, for example, STA 130 with other equipment such as, for example, personal computers, workstations, printers, and the like.

In some embodiments, AP 110 may include a transmitter 111 and a receiver 112 to transmit and receive network traffic, e.g., over wireless links 128, 138, and 148. In addition, AP 110 may include a physical layer (PHY) 113 and a media access controller (MAC) 114 to control the operation of the transmitter and receiver. Transmitter 111 and receiver 112 may include any components involved in the process of transmitting and receiving network traffic, respectively, including components of PHY 113 and MAC 114. Similarly, STA 120 and STA 140 may include, respectively, transmitters 121 and 141, receivers 122 and 124, PHYs 123 and 143, and MACs 124 and 144. It will be appreciated that AP 110 and STAs 120, 130 and 140 may include other suitable software and/or hardware elements, e.g., a memory, a processor, a storage unit, and the like.

Although embodiments of the invention are not limited in this respect, AP 110 may be able to transmit and receive frames using several modulation schemes and/or frame formats. For example, AP 110 may use a first modulation scheme, e.g., a high-throughput (HT) modulation scheme such as a multiple-input-multiple-output (MIMO) orthogonal frequency division multiplexing (OFDM) modulation scheme, to communicate traffic with a HT station, e.g., STA 120. Although embodiments of the invention are not limited in this respect, one or more components of AP 110 and/or STA 120, e.g., PHYs 113 and 123 and MACs 114 and 124, respectively, may be adapted to operate in accordance with the 802.11n standard or another wireless communication protocol that allows relatively high throughput, e.g., up to 600 megabytes per second. In accordance with embodiments of the invention, the first modulation scheme may be used with multiple frame formats, e.g., a HT-optimal format and a mixed-mode format, as explained in more detail below with reference to FIG. 2. In some embodiments, STA 120 and AP 110 may use different first and second frame formats of the same modulation scheme, e.g., the high-throughput modulation scheme MIMO-OFDM.

In some embodiments, one or more stations of WLAN 100, e.g., STA 140, may transmit and receive frames using a second modulation scheme, which may be different from the first modulation scheme used by AP 110 and/or the scheme used by other stations of WLAN 100. For example, STA 140 may use orthogonal frequency division multiplexing (OFDM) in accordance with the 802.11a standard, or any other standard that may have a lower throughput than that of the first modulation scheme.

Although embodiments of the invention are not limited in this respect, STA 140 may be a legacy station that may not be able to demodulate and/or decode frames transmitted in the first modulation scheme. It will be appreciated that AP 110 may be able to use the second modulation scheme to communicating traffic to a non-HT station such as legacy STA 140. Additionally or alternatively, high-throughput STA 120 may not be able to demodulate and/or decode frames transmitted in the first modulation scheme using a different frame format. However, AP 110 may still be able to properly receive frames transmitted by STA 140 and/or STA 120 using the second modulation scheme and/or frame format.

In some embodiments, a BSS of communication system 100 may include a high throughput AP, e.g., AP 110 using the first modulation scheme such as MIMO-OFDM, and one or more high throughput stations, e.g., STA 120, as well as one or more legacy stations, e.g., STA 140 using the second modulation scheme, such as OFDM. Optionally, in some embodiments communication system 100 may include a protection mechanism to prevent collision of frames. For example, when AP 110 transmits traffic including frames of the first modulation scheme, it may be necessary for stations, including stations adapted to use the second modulation scheme, to detect that the wireless medium is busy and not attempt to transmit. Although embodiments of the invention are not limited in this respect, a protection method may depend on an accurate estimate of the frame size and transmittal time, as explained in more detail below with reference to FIGS. 2-4.

Figure 2:
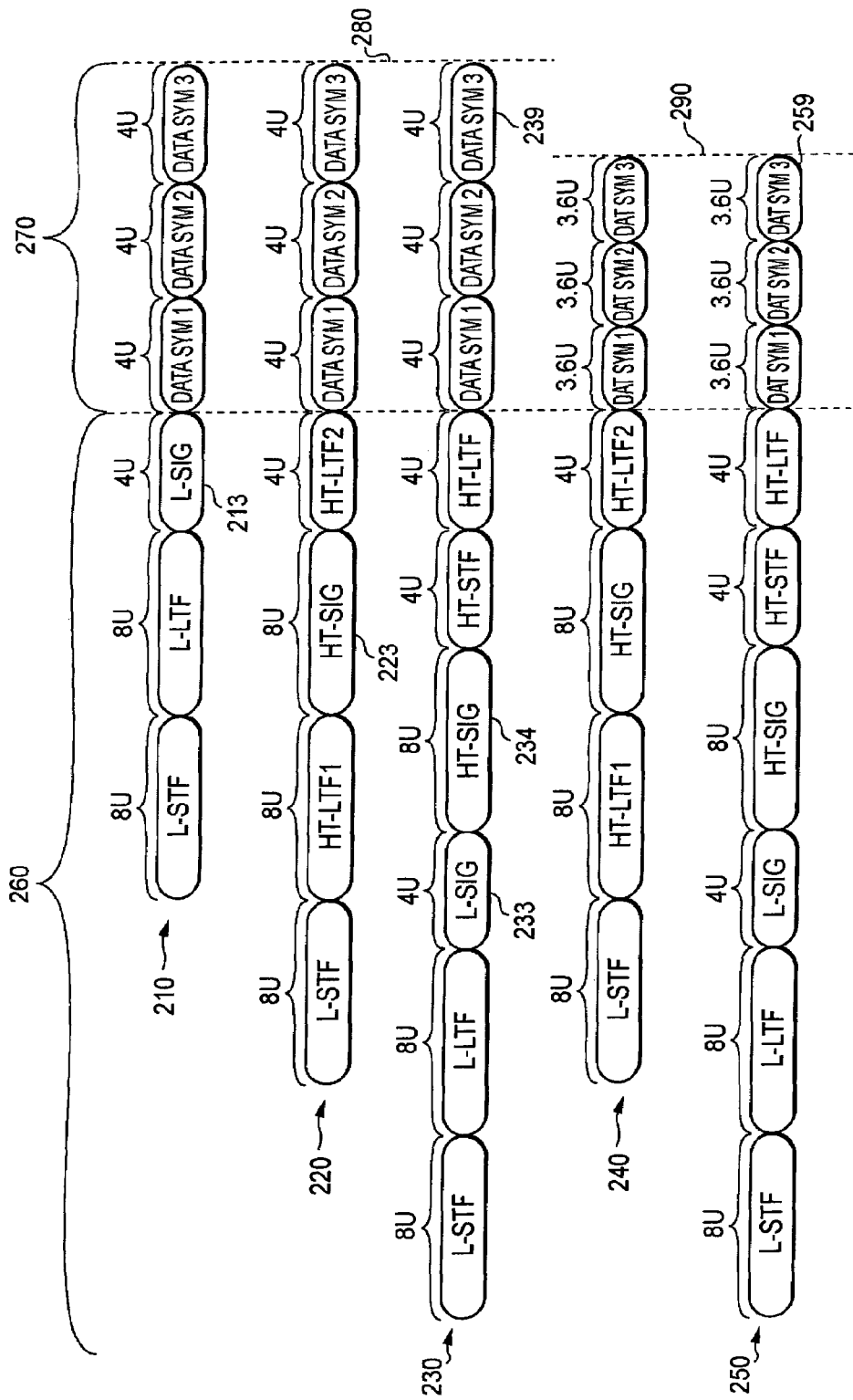
FIG. 2 is a schematic diagram of different frame formats that may be helpful in understanding some demonstrative embodiments of the invention.

Reference is made to FIG. 2, which schematically illustrates different frame formats that may be used in some demonstrative embodiments of the invention, and is helpful in understanding alignment requirements in accordance with embodiments of the invention. Although embodiments of the invention are not limited in this respect, a high-throughput access point, e.g., AP 110, may be able to transmit and receive frames of multiple formats as described below.

Although embodiments of the invention are not limited in this respect, a wireless communication device, e.g., a station of a WLAN such as communication system 100, may be adapted to transmit and/or receive frames of a specific format, which may correspond to a certain modulation scheme. The frame formats may include a headings and preambles portion 260 and a data portion 270. The headings and preambles portion 260 may include one or more fields, e.g., a training field and a signal field. The data portion 270 may include one or more data symbols.

For example, a "legacy" format 210 may correspond to OFDM modulation in accordance with 802.11a, and a "greenfield" format 220 may correspond to MIMO-OFDM modulation in accordance with 802.11n, as is known in the art. Greenfield format 220 may be optimal for a HT station, e.g., STA 120. Legacy format 210 may include a legacy signal field 213 in the preamble portion 260, which may identify the type of modulation scheme used, and may include information such as the data rate and the length of the subsequent data portion 270. The legacy signal field may be read by a legacy station, e.g., STA 140. Similarly, greenfield format 220 may include a high-throughput signal field 223, which may not be readable by a station that is not adapted to use the high-throughput modulation, e.g., a legacy OFDM station.

Other frame formats and modulation schemes may be used. For example, a "mixed-mode" format 230 may also correspond to MIMO-OFDM modulation in accordance with 802.11n, but include both a legacy signal field 233 and a high-throughput signal field 234. Thus, stations using either a first modulation scheme, e.g., MIMO-OFDM, or a second modulation scheme, e.g., legacy OFDM, may be able to obtain information regarding the data rate and length of the subsequent data portion 270.

In some embodiments, the modulation scheme used may include a shortened guard interval (GI) in the data symbols of data portion 270. For example, a format 240 may be a short GI format corresponding to the regular GI greenfield format 220 and a format 250 may be a short GI format corresponding to the regular GI mixed-mode format 230. Although embodiments of the invention are not limited in this respect, a data symbol in a regular GI format, e.g., data symbol 239 of mixed-mode format 230, may have a length measured in 4 units, e.g., 4 microseconds, whereas a data symbol in a short GI format, e.g., data symbol 259 of short GI mixed mode-format 250, may have a length measured in 3.6 units, e.g., 3.6, microseconds.

In accordance with the 802.11 set of standards, an inter frame space (IFS) may begin following the last data symbol in data portion 270 of a transmitted frame. Some demonstrative embodiments of the invention may provide a method to synchronize the IFS between the transmitting station and all receiving stations, so as to start at the same time. It will be appreciated that in order to calculate the IFS start time, it may be necessary for a receiving station to be able to read all relevant parameters of the received frame, e.g., as found in the signal field. The IFS start time may vary according to the modulation scheme used and the number of data symbols in the data portion, which may be of different lengths. For example, the IFS start time may depend on the frame format (e.g., legacy, mixed-mode, or greenfield), the transmission rate (e.g., as indicated in the legacy and HT signal fields), data length (e.g., the byte count of the data, as indicated in the legacy and HT signal fields), and guard interval format (e.g., regular or shortened, as indicated in the HT signal field). Although embodiments of the invention are not limited in this respect, a frame with a regular GI format (e.g., mixed-mode format 230 or greenfield format 220) may have an IFS start time 280 at a boundary that is an integer multiple of 4 units, whereas a short GI format (e.g., mixed-mode format 250 or short GI greenfield format 240) may have an IFS start time 290 that is not located at an integer multiple of 4 units. Thus, in a network that includes coexistence of different modulation schemes and frame formats, e.g., a WLAN such as communication system 100, embodiments of the present invention may enable alignment of the IFS start time between transmitted and received frames, thereby to prevent frame collision without resorting to a costly protection mechanism.

Reference is again made to FIG. 1. In accordance with the 802.11 set of standards, the MAC, e.g., MAC 114 of AP 110, may perform functionality related to the data link layer of the open systems interconnect (OSI) model, as known in the art, and prepare data for transmission by the PHY, e.g., PHY 113. For example, the MAC functionality may include delimiting frames, inserting MAC headers, error detection and/or correction functionality, and controlling access to the physical medium. The PHY, e.g., PHY 113, may include circuitry for encoding, transmission, reception, and decoding of wireless signals, packets, and/or frames, as part of the physical layer of the OSI model. For example, the PHY may receive a PSDU (PHY Service Data Unit) from the MAC, and append physical layer dependent information, e.g., information relating to the modulation scheme used, in the preamble of the PSDU, thereby to form a PPDU (PHY protocol data unit) frame suitable for transmission.

An interface 115 between MAC 114 and PHY 113 may use primitives, as known in the art, to communicate information between the PHY and the MAC. For example, a PHY-CCA.indicate primitive, which may hold a value of either busy or idle, may be communicated from the PHY to the MAC. Although embodiments of the invention are not limited in this respect, the PHY may include a carrier sense function to sense the physical (wireless) medium when the station is not actively transmitting or receiving. For example, the PHY may generate a clear channel assessment (CCA) based on a detected energy level. Based on the indication from the PHY, the MAC may decide when to send a frame for transmission. For example, the MAC may delay transmission for a time period corresponding to the IFS, which may begin after receiving a PHY-CCA.indicate(idle) primitive from the PHY.

Reference is now made to FIG. 3, which schematically illustrates alignment between a transmitted frame 310 and a received frame 320 in accordance with one demonstrative embodiment of the invention. For example, frames 310 and 320 may be of a short GI format, e.g., the mixed-mode short GI format 250 illustrated in FIG. 2.

During transmission, the PHY of the transmitting station, e.g., PHY 113 of AP 110, may calculate a transmission time 330 such that the start of the IFS time may be aligned with the IFS start time calculated by the PHY of the receiving station, e.g., PHY 123 of STA 120 and/or PHY 143 of STA 140. For example, the receiving PHY may calculate the IFS start time according to the information in the signal field of the received frame, e.g., legacy signal field 323 or high-throughput signal field 324 of received frame 320.

It will be appreciated that the receiving PHY may be adapted to align to the legacy GI format and may thus calculate the IFS start time as is known in the art, e.g., at a 4 unit boundary such as time 340. Thus, in order to align the IFS start time, in some embodiments the transmitting PHY may calculate the transmission time 330 to similarly end at the 4 unit boundary 340, which may be longer than the actual end of transmission at time 350. Such an alignment may enable synchronization between stations of different modulation schemes.

Although embodiments of the invention are not limited in this respect, transmission time 330 may be calculated using the following equation:

$$TXTIME = T_{LEG\_PREAMBLE} + T_{LEG\_SIGNAL} + T_{HT\_PREAMBLE} + T_{HT\_SIGNAL} + T_{REG\_SYM} ? \text{Ceiling} ? T_{SGI\_SYM} / T_{REG\_SYM} ? \times N_{SYM} ? \quad \text{(Equation 1)}$$

wherein:

$T_{LEG\_PREAMBLE}$ is the duration of the legacy preamble, e.g., training fields 311 and 312;

$T_{LEG\_SIGNAL}$ is the duration of the legacy signal field, e.g., signal field 313;

$T_{HT\_PREAMBLE}$ is the duration of the HT preamble, e.g., training fields 315 and 316;

$T_{HT\_SIGNAL}$ is the duration of the HT signal field, e.g., signal field 314;

$T_{REG\_SYM}$ is the time required to transmit a data symbol having a regular guard interval;

$T_{SGI\_SYM}$ is the time required to transmit a data symbol having a shortened guard interval; and $N_{SYM}$ is the total number of data symbols in the data portion, which may be calculated according to the following formula:

$$N_{SYM} = \begin{cases} m_{STBC} \times \text{ceiling}\left(\dfrac{8 \cdot \text{length} + 16 + 6 \cdot N_{ES}}{m_{STBC} \cdot N_{DBPS}}\right) & \text{When } BCC \text{ is used} \\ N_{avbits} / N_{CBPS} & \text{When } LDPC \text{ is used} \end{cases} \quad \text{(Formula 1)}$$

Detailed definitions of the parameters appearing in Formula 1 may be found, for example, in section 4 of "Joint Proposal: High throughput extension to the 802.11 Standard: PHY" which is part of the IEEE 802.11 TGn Joint Proposal Technical Specification, dated Jan. 13, 2006. For example:

length is the number of octets in the data portion of the PPDU;

$m_{STBC}$ is equal to 2 when space time block code (STBC) is used, and otherwise 1;

$N_{ES}$ is the number of encoders used, e.g., 1 or 2;

$N_{DBPS}$ is the number of data bits per symbol; and $N_{CBPS}$ is the number of code bits per symbol.

Reference is now made to FIG. 4, which schematically illustrates alignment between a transmitted frame 410 and received frames 420 and 430 in accordance with another demonstrative embodiment of the invention. For example, frames 410, 420, and 430 may be of a short GI format, e.g., the short GI greenfield format 240 illustrated in FIG. 2.

During transmission, the transmitting PHY, e.g., PHY 113 of AP 110, may calculate a transmission time 440 such that the start of the IFS time may be aligned with the IFS start time calculated by the receiving PHY of the receiving station, e.g., PHY 123 of STA 120 and/or PHY 143 of STA 140.

For example, frame 420 may be received by a high-throughput station, e.g., STA 120, which may be adapted to use the first modulation scheme that may also be used by the transmitting PHY. In such a case, the receiving PHY, e.g., PHY 123, may calculate the IFS start time according to the information in the high-throughput signal field 423 of received frame 420 and may, for example, send a PHY-CCA.indicate(idle) primitive at the end of the last received data symbol of the frame. In accordance with embodiments of the invention, the calculated transmission time 440 may be synchronized with the IFS start time 450 after the last received data symbol, which may not be at a 4-unit boundary.

In another example, frame 430 may be received by a legacy station, e.g., STA 140, which may be adapted to use a second modulation scheme that may be different from the scheme used by the transmitting PHY. In such a case, the receiving PHY, e.g., PHY 143, may not be able to read the high-throughput signal field 433 of received frame 430. Thus, in some embodiments, the receiving PHY may use a carrier sense function to detect that the wireless medium is busy based on a detected energy level. As indicated in FIG. 4, an energy detection period 460 may be aligned with the transmission time 440 and IFS start time 450.

In yet another example, the receiving PHY, e.g., PHY 123 of high-throughput station 120, may be able to read-the high-throughput signal field 433, yet not be able to demodulate/decode the received frame 430. For example, PHY 123 may be adapted to use a regular guard interval greenfield format, while the transmitted frame 410 is of a short GI greenfield format. In such a case, PHY 123 may also use energy detection 460 to align the IFS start time 450 with the calculated transmission time 440.

Although embodiments of the invention are not limited in this respect, transmission time 330 may be calculated using the following equation:

$$TXTIME = T_{HT\_PREAMBLE} + T_{HT\_SIGNAL} + T_{SGI\_SYM} \times N_{SYM} \quad \text{(Equation 2)}$$

wherein:

$T_{HT\_PREAMBLE}$ is the duration of the HT preamble, e.g., training fields 411, 412, and 414;

$T_{HT\_SIGNAL}$ is the duration of the HT signal field, e.g., signal field 413;

$T_{REG\_SYM}$ is the time required to transmit a data symbol having a regular guard interval;

$T_{SGI\_SYM}$ is the time required to transmit a data symbol having a shortened guard interval; and $N_{SYM}$ is the total number of data symbols in the data portion, which may be calculated according Formula 1, as detailed above.

Embodiments of the present invention may be implemented by software, hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
   transmitting, from a transmitter, a wireless transmission of a frame using a short-guard-interval physical-layer-protocol-data-unit (PPDU) format selected from first and second, different, short-guard-interval PPDU formats;
   if the first PPDU format is selected, calculating a transmission time corresponding to the transmission based on a first predefined calculation, wherein the transmission time resulting from the first calculation is different from an actual transmission time of the transmission;
   if the second PPDU format is selected, calculating the transmission time corresponding to the transmission based on a second predefined calculation, different from the first calculation, wherein the transmission time resulting from the second calculation is equal to an actual transmission time of the transmission; and
   setting an inter frame space start time succeeding the transmission of the frame to begin at the end of the calculated transmission time.

2. The method of claim 1, wherein the first calculation includes adjusting a transmission duration of a data portion of a transmission of the frame using a regular guard interval, and wherein the adjusting includes adjusting the duration of the data portion based on a ratio between a transmission duration of a data symbol having a short guard interval and a transmission duration of a data symbol having the regular guard interval.

3. The method of claim 1, wherein the second calculation includes calculating the actual transmission duration of a data portion of the transmission using a short guard interval.

4. The method of claim 1, wherein said first PPDU format includes a short-guard-interval mixed mode format including both a signal field of a first modulation scheme and a signal field of a second modulation scheme.

5. The method of claim 1, wherein the first and second PPDU formats include PPDU formats of first and second, different, modulation schemes, respectively.

6. The method of claim 1, wherein at least one of the first and second PPDU formats uses a space time block code coding scheme.

7. The method of claim 1, wherein the transmission includes a multi-input-multi-output transmission, and wherein the second PPDU format comprises a short guard interval greenfield format.

8. The method of claim 4, wherein the first calculation includes summing a duration of a first preamble and a first signal field corresponding to a first modulation scheme, a duration of a second preamble and a second signal field, corresponding to a second modulation scheme, and the adjusted transmission duration of the data portion.

9. The method of claim 1, wherein the transmission time resulting from the first calculation is greater than the actual transmission time of the transmission.

10. The method of claim 1, comprising detecting the transmitted frame and setting an inter frame space staff time succeeding the detected transmission based on a physical-layer clear-channel-assessment indication.

11. An apparatus comprising:
    a transmitter to transmit a wireless transmission of a frame using a short-guard-interval physical-layer-protocol-data-unit (PPDU) format selected from first and second, different, short-guard-interval PPDU formats; if the first PPDU format is selected, to calculate a transmission time corresponding to the transmission based on a first predefined calculation, wherein the transmission time resulting from the first calculation is different from an actual transmission time of the transmission; if the second PPDU format is selected, to calculate the transmission time corresponding to the transmission based on a second predefined calculation, different from the first calculation, wherein the transmission time resulting from the second calculation is equal to an actual transmission time of the transmission; and to set an inter frame space start time succeeding the transmission of the frame to begin at the end of the calculated transmission time.

12. The apparatus of claim 11, wherein the second calculation includes calculating the actual transmission duration of a data portion of the transmission using a short guard interval.

13. The apparatus of claim 11, wherein said first PPDU format includes a short-guard-interval mixed mode format including both a signal field of a first modulation scheme and a signal field of a second modulation scheme.

14. The apparatus of claim 11, wherein the first calculation includes adjusting a transmission duration of a data portion of a transmission of the frame using a regular guard interval, and wherein the transmitter is to adjust the duration of the data portion based on a ratio between a transmission duration of a data symbol having a short guard interval and a transmission duration of a data symbol having the regular guard interval.

15. The apparatus of claim 11, wherein the first and second PPDU formats include PPDU formats of first and second, different, modulation schemes, respectively.

16. The apparatus of claim 11, wherein at least one of the first and second PPDU formats uses a space time block code coding scheme.

17. The apparatus of claim 11, wherein the transmission includes a multi-input-multi-output transmission, and wherein the second PPDU format comprises a short guard interval greenfield format.

18. The apparatus of claim 14, wherein the first calculation includes summing a duration of a first preamble and a first signal field corresponding to a first modulation scheme, a duration of a second preamble and a second signal field corresponding to a second modulation scheme, and the adjusted transmission duration of the data portion.

19. A system comprising:
a wireless communication device comprising a transmitter to generate a wireless transmission of a frame using a short-guard-interval physical-layer-protocol-data-unit (PPDU) format selected from first and second, different, short-guard-interval PPDU formats; if the first PPDU format is selected, to calculate a transmission time corresponding to the transmission based on a first predefined calculation, wherein the transmission time resulting from the first calculation is different from an actual transmission time of the transmission; if the second PPDU format is selected, to calculate the transmission time corresponding to the transmission based on a second predefined calculation, different from the first calculation, wherein the transmission time resulting from the second calculation is equal to an actual transmission time of the transmission; and to set an inter frame space start time succeeding the transmission of the frame to begin at the end of the calculated transmission time; and
an antenna to transmit a signal carrying said frame.

20. The system of claim 19, wherein the second calculation includes calculating the actual transmission duration of a data portion of the transmission using a short guard interval.

21. The system of claim 19, wherein said first PPDU format includes a short-guard-interval mixed mode format including both a signal field of a first modulation scheme and a signal field of a second modulation scheme.

22. The system of claim 19, wherein the first calculation includes adjusting a transmission duration of a data portion of a transmission of the frame using a regular guard interval, and wherein the transmitter is to adjust the duration of the data portion based on a ratio between a transmission duration of a data symbol having a short guard interval and a transmission duration of a data symbol having the regular guard interval.

23. The system of claim 19, wherein the first and second PPDU formats include PPDU formats of first and second, different, modulation schemes respectively.

24. The system of claim 19, comprising:
another wireless communication device comprising a receiver able to detect said signal.

* * * * *

UNITED STATES PATENT AND TRADEMARK OFFICE
CERTIFICATE OF CORRECTION

PATENT NO. : 7,715,442 B2 Page 1 of 1
APPLICATION NO. : 11/360865
DATED : May 11, 2010
INVENTOR(S) : Solomon B. Trainin et al.

It is certified that error appears in the above-identified patent and that said Letters Patent is hereby corrected as shown below:

In column 9, line 50, in claim 1, delete "physical- layer" and insert -- physical-layer --, therefor.

In column 9, line 52, in claim 1, delete "short- guard" and insert -- short-guard --, therefor.

In column 10, line 29, in claim 8, delete "field," and insert -- field --, therefor.

In column 10, line 36, in claim 10, delete "staff" and insert -- start --, therefor.

Signed and Sealed this

Tenth Day of August, 2010

David J. Kappos
*Director of the United States Patent and Trademark Office*